United States Patent
Weisel et al.

(10) Patent No.: US 9,082,519 B2
(45) Date of Patent: Jul. 14, 2015

(54) UPPER INTERNALS ARRANGEMENT FOR A PRESSURIZED WATER REACTOR

(75) Inventors: Eric M. Weisel, Windsor Locks, CT (US); Kenneth V. Margotta, Ellington, CT (US); Daniel Walus, Amherst, MA (US); Thomas J. Schildkamp, Jeannette, PA (US); Joseph J. Hahn, Pittsburgh, PA (US); Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 857 days.

(21) Appl. No.: 12/638,138

(22) Filed: Dec. 15, 2009

(65) Prior Publication Data

US 2010/0150294 A1 Jun. 17, 2010

Related U.S. Application Data

(60) Provisional application No. 61/138,155, filed on Dec. 17, 2008.

(51) Int. Cl.
| | |
|---|---|
| *G21C 17/108* | (2006.01) |
| *G21C 13/02* | (2006.01) |
| *G21C 17/10* | (2006.01) |
| *G21C 17/116* | (2006.01) |
| *G21C 19/02* | (2006.01) |

(52) U.S. Cl.
CPC ............... *G21C 13/02* (2013.01); *G21C 17/10* (2013.01); *G21C 17/116* (2013.01); *G21C 19/02* (2013.01); *Y02E 30/40* (2013.01)

(58) Field of Classification Search
USPC .................................................. 376/254, 255
See application file for complete search history.

(56) References Cited

U.S. PATENT DOCUMENTS

| | | | |
|---|---|---|---|
| 3,827,935 A | 8/1974 | Gruner et al. | |
| 4,318,776 A * | 3/1982 | Proll et al. | 376/254 |
| 4,716,004 A * | 12/1987 | Merkovsky et al. | 376/203 |
| 5,057,270 A * | 10/1991 | Chevereau | 376/254 |
| 5,078,957 A * | 1/1992 | Tower et al. | 376/254 |
| 2008/0137799 A1* | 6/2008 | Hellandbrand et al. | 376/438 |
| 2008/0253497 A1* | 10/2008 | Singleton et al. | 376/353 |
| 2010/0166134 A1* | 7/2010 | Park et al. | 376/364 |

\* cited by examiner

*Primary Examiner* — Jack W Keith
*Assistant Examiner* — Sean P Burke
(74) *Attorney, Agent, or Firm* — Richard J. Coldren; Westinghouse Electric Company LLC

(57) ABSTRACT

A telescoping guide for extraction and reinsertion support handling of in-core instrument thimble assemblies in the area above the upper support plate in the upper internals of a pressurized water reactor. The telescoping guides extend between the upper ends of the upper internals support columns and an axially movable instrumentation grid assembly which is operable to simultaneously raise the telescoping guides and extract the in-core instrument thimble assemblies from the reactor fuel assemblies.

13 Claims, 10 Drawing Sheets

UPPER INTERNALS ARRANGEMENT FOR A PRESSURIZED WATER REACTOR

CROSS REFERENCE TO RELATED APPLICATION

This application claims priority to provisional patent application Ser. No. 61/138,155 filed Dec. 17, 2008.

BACKGROUND OF THE INVENTION

1. Field of the Invention

This invention relates to water cooled nuclear reactors, and more particularly, to pressurized water reactors having in-core instrumentation (in-core instrument thimble assemblies) that enter the reactor vessel through penetrations from the top of the reactor vessel and are used to monitor the neutron activities and coolant temperature within the core fuel assemblies.

2. Description of Related Art

Many water cooled nuclear reactors utilize a core of vertically positioned fuel assemblies within a reactor vessel. To monitor the neutron activities and coolant temperature within the core fuel assemblies, movable in-core instrumentation, such as movable neutrons detectors, conventionally enter the core from penetrations in the bottom of the vessel. In a few instances in the past, leakage occurred at the penetrations at the bottom of the vessel which presented significant repair problems. Accordingly, it would be desirable to have all of the in-core instrumentation access the core through penetrations from the top of the reactor vessel. Additionally, fixed in-core neutron detectors have been employed that reside in the fuel assemblies during reactor operation. In addition to fixed in-core instrumentation that enter through penetrations in the bottom of the vessel, there are fixed in-core instrumentation that enter through penetrations in the top of the vessel. In this latter configuration, each in-core instrument thimble assembly is totally enclosed in a guide path composed of tubing. The lower portion of this guide path extends down into the fuel assembly. However, even the fixed in-core neutron detectors have to be withdrawn from the fuel assemblies before the reactor core can be accessed for refueling operations. Thus, it is therefore necessary to provide structure which can satisfactorily guide and protect the in-core instrumentation entering from the top of the vessel and mitigate the potential for leakage.

Guidance for the instrumentation is needed through the area above the upper core plate, which is just above the fuel assemblies, to an elevation above the upper support plate which is spaced from and sits above the upper core plate, so that the in-core instrumentation can be withdrawn so its lower most extremity is at least at or about the mid plane of the upper core plate. This is necessary so that the upper internals can be removed to access the core for servicing, such as refueling. The existing upper support columns are available in between the upper core plate and upper support plate assembly to provide such guidance. However, presently there is no support for the instrumentation above the upper support plate assembly through which the in-core instrumentation has to be withdrawn to clear the bottom of the upper core plate. Accordingly, a new structure is needed that will provide guidance and protection for the in-core instrumentation in an elevation above the upper support plate assembly without impeding coolant flow in the upper internals during reactor operation.

SUMMARY OF THE INVENTION

This invention provides support for the in-core instrumentation above the upper support plate when the in-core instrumentation is withdrawn from the core. The design of this invention provides a support system for the upper internals in-core instrumentation. Furthermore, the design of this invention minimizes additional disassembly requirements to remove and install the upper internals guide tubes in the event maintenance of the guide tubes is required.

As previously noted, it is desirable to route the in-core instrumentation through the upper reactor head rather than the bottom of the reactor vessel. The in-core instrumentation routed through penetrations in the reactor head have to pass through the upper internals package to gain access to the instrumentation tubes centrally located within the fuel assemblies within the core. The upper internals package includes: an upper core plate which sits over the fuel assemblies; an upper support plate which is spaced above and over the upper core plate and attached to either the reactor vessel or the head; and hollow support columns which extend between the upper core plate and the upper support plate and are aligned with holes in both the upper core plate and the upper support plate, with the holes in the upper core plate communicating with the instrumentation tubes within the fuel assemblies.

In accordance with this invention, an axially slidable sleeve extends through an upper end in at least some of the support columns which are aligned with corresponding instrumentation tubes. The axially slidable sleeves are extendable from the corresponding support columns through openings in the upper support plate to an area above the upper support plate at an elevation that is sufficient to shield the in-core instrument thimble assemblies in their withdrawn position. Preferably, the upper internals package includes an instrumentation grid assembly positioned above the upper support plate, that extends over each of the slidable sleeves. The instrumentation grid assembly has openings through which the slidable sleeves extend at least partially through with an upper portion of the slidable sleeve attached to the instrumentation grid assembly. The instrumentation grid assembly is configured to be movable in an axial direction to slide each of the slidable sleeves within the corresponding support columns in unison. A plurality of guide studs axially extend from an upper surface of the upper support plate and through corresponding openings in the instrumentation grid assembly, for laterally supporting the instrumentation grid assembly as it moves axially. Preferably, at least some of the guide studs are spaced around the perimeter of the instrumentation grid assembly. In one embodiment, there are approximately four guide studs substantially equally spaced around the perimeter of the instrumentation grid assembly.

In one preferred embodiment, the slidable sleeves comprise a plurality of concentric telescoping tubes that extend between the instrumentation grid assembly and the corresponding support column. Preferably, a spiral spring extends around an inner most one of the concentric telescoping tubes below an attachment of the slidable sleeve to the instrumentation grid assembly between the attachment of the slidable sleeve to the instrumentation grid assembly and another of the telescoping tubes. The spring provides a holddown force on the telescoping tubes when the instrumentation grid assembly is in a lower most position, to prevent vibration during reactor operation. Desirably, one end of the spring extends at least partially into the opening in the instrumentation grid assembly through which the slidable sleeve extends and another end of the spring extends axially below the opening in the instrumentation grid assembly. The lower end of the spring is preferably surrounded by a can housing that is slidably mounted within the instrumentation grid assembly opening. Desirably, an upper portion of the can housing is captured within the opening of the instrumentation grid assembly to restrain the spring between the instrumentation grid assembly opening and the bottom of the can housing.

In one embodiment, a lower portion of an inner most telescoping member of the slidable sleeve is enlarged and restrained below a narrowed opening within an upper portion of a surrounding member of the slidable sleeve so that lower portion of the inner most member of the slidable sleeve is captured within the opening of the surrounding member. Preferably, the slidable sleeve extends axially to at least an elevation above the upper support plate that will support the in-core instrument thimble assembly when the in-core instrument thimble assembly is raised, to at least the mid plane of the upper core plate, without the in-core instrument thimble assembly extending above the slidable sleeve when the reactor is shut down and the core is to be accessed. Desirably, the slidable sleeve extends above the upper support plate for at least 15.4 feet (47 meters).

Furthermore, the invention contemplates a nuclear electric power generating facility having a pressurized water reactor nuclear steam supply system of the type described above.

Furthermore, the invention contemplates a method of accessing a nuclear reactor core having a plurality of elongated fuel assemblies enclosed within a pressure vessel of a pressurized water reactor, wherein at least some of the fuel assemblies have at least one instrumentation tube axially extending therethrough for housing in-core instrumentation and the core is covered by an upper internals package that is sealed within the pressure vessel by a removable head. The upper internals package includes an upper core plate positioned over the fuel assemblies and an upper support plate spaced above and positioned over the upper core plate with a plurality of support columns extending axially between the upper core plate and the upper support plate with at least some of the support columns aligned with a corresponding one of the instrumentation tubes; the support columns aligned with the instrumentation tubes having a slidable sleeve that is movable within the support columns and extendable above the upper support plate. The method for accessing the core comprises removing the removable head from the pressure vessel; raising the slidable sleeves so that an upper portion thereof extends above the upper support plate; withdrawing the in-core instrumentation from the instrumentation tubes in the fuel assemblies so a lower most extremity of the in-core instrumentation is approximately at or above a mid point in a width of the upper plate; and removing the upper internals package to access the core. Preferably, the step of raising the slidable sleeves raises the sleeves all at one time. In that regard, desirably the upper internals package includes an axially movable instrumentation grid assembly positioned above the upper support plate and attached to an upper end of each of the slidable sleeves wherein the step of raising the slidable sleeves involves raising the instrumentation grid assembly.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
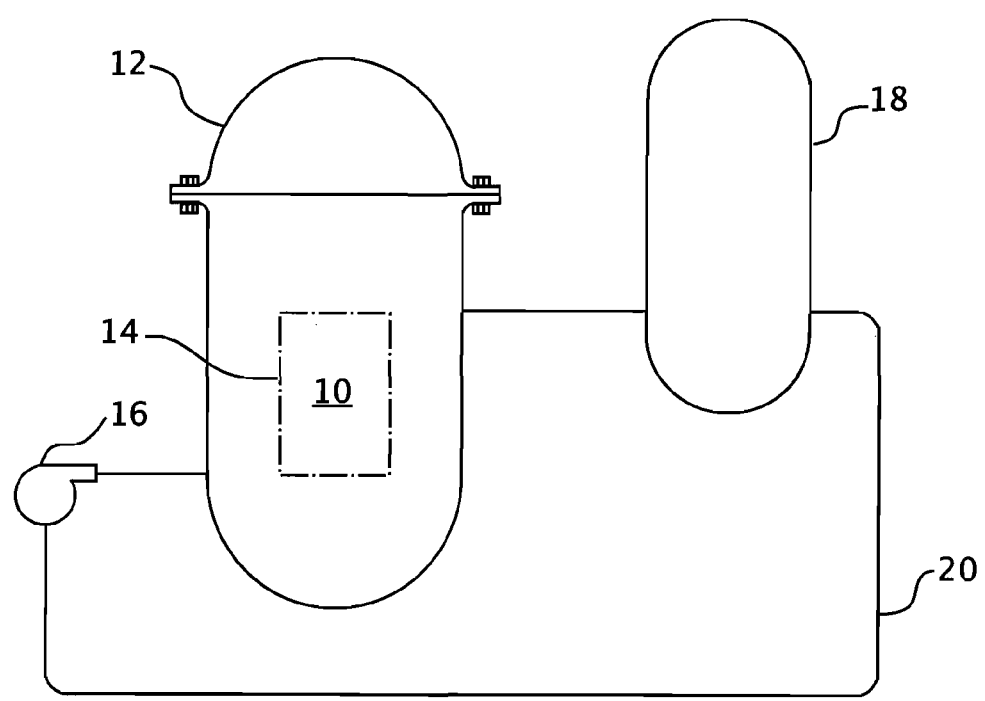
FIG. 1 is a simplified schematic of a nuclear reactor to which this invention may be applied.

Referring now to the drawings, FIG. 1 shows a simplified nuclear reactor primary system, including a generally cylindrical pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown) such as a steam driven turbine generator. The reactor coolant is then returned through pump 16, completing the primary loop. Typically, a plurality of the above described loops are connected to a sealed reactor vessel 10 by reactor coolant piping 20.

Figure 2:
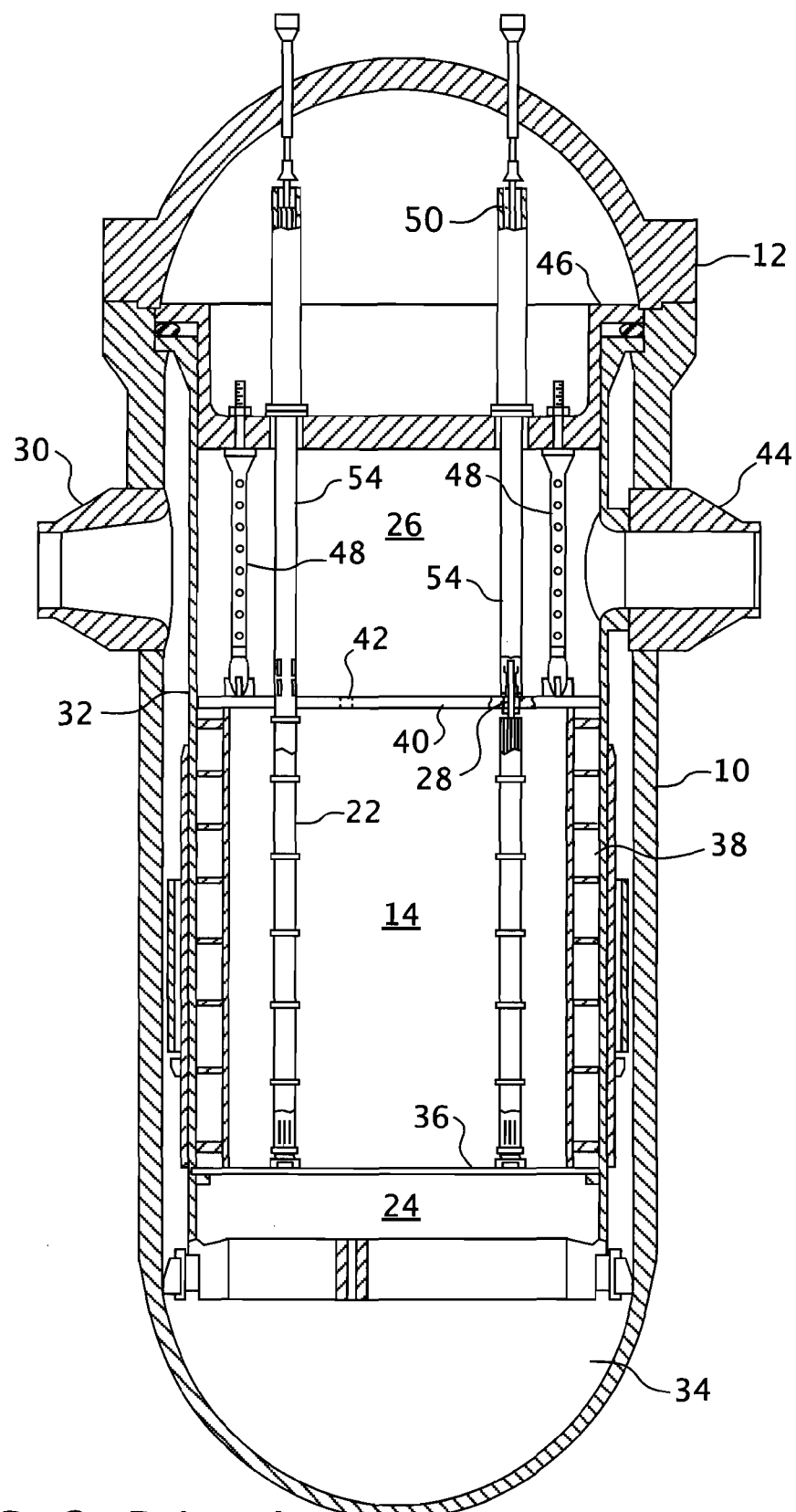
FIG. 2 is an elevational view, partially in section, of a nuclear reactor vessel and internal components to which this invention may be applied.

A conventional reactor design is shown in more detail in FIG. 2. As previously mentioned, though not shown in FIG. 2, in a conventional pressurized water reactor design, the movable in-core neutron detectors enter the core from the bottom of the reactor through tubes that extend from penetrations in the vessel bottom to the lower core plate 36 where they mate with the instrumentation tubes within the fuel assemblies. Furthermore, in such a traditional reactor design, the thermocouples that measure core temperature enter the upper head 12 through a single penetration and are distributed by a yoke or cable conduit, such as is shown in U.S. Pat. No. 3,827,935, to individual support columns 48 and thereby to various fuel assemblies.

In addition to the core 14, comprised of a plurality of parallel, vertical co-extending fuel assemblies 22, for purposes of this description, the other vessel internal structures can be divided into the lower internals 24 and the upper internal 26. In conventional designs, the lower internals function to support, align and guide core components and instrumentation, as well as to direct coolant flow within the vessel. The upper internals restrain or provide a secondary restraint for the fuel assemblies 22 (only two of which are shown for simplicity), and support and guide instrumentation and components such as control rods 28.

In the exemplary reactor shown in FIG. 2, coolant enters the vessel 10 through one or more inlet nozzles 30, flows downward about a core barrel 32, is turned 180° in a lower plenum 34, passes upwardly through a lower core support plate 36 upon which the fuel assemblies 22 are seated, and through and about the assemblies. The coolant flow through the core and surrounding area 38 is typically large, in the order of 400,000 gallons per minute at a velocity of approximately 20 feet per second (6.1 meters per second). The resulting pressure drop and frictional forces tend to cause the fuel assemblies to rise, which movement is restrained by the upper internals, including a circular upper core plate 40. Coolant exiting the core 14 flows along the under side of the upper core plate 40 and upwardly through a plurality of perforations 42. The coolant then flows upwardly and radially through one or more outlet nozzles 44.

The upper internals 26 can be supported from the reactor vessel 10 or the vessel closure head 12 and includes an upper support assembly 46 which is also referred to as the upper support plate. Loads are transmitted between the upper support plate 46 and the upper core plate 40 primarily by a plurality of support columns 48. A support column is aligned above a selected fuel assembly 22 and perforation 42 in the upper core plate 40 to provide access to elongated axial instrumentation tubes centrally located within each fuel assembly with the instrumentation tubes being co-extensive with the fuel assemblies' control rod guide thimbles.

Rectilinearly movable control rods 28, typically including a drive shaft 50 and a spider assembly of neutron absorbing rods, are guided through the upper internals 26 and into aligned fuel assemblies 22 by control rod guide tubes 54. The guide tubes are fixedly joined to the upper support assembly 46 and connected by a split pin force fed into the top of the upper core plate 40.

Figure 3:
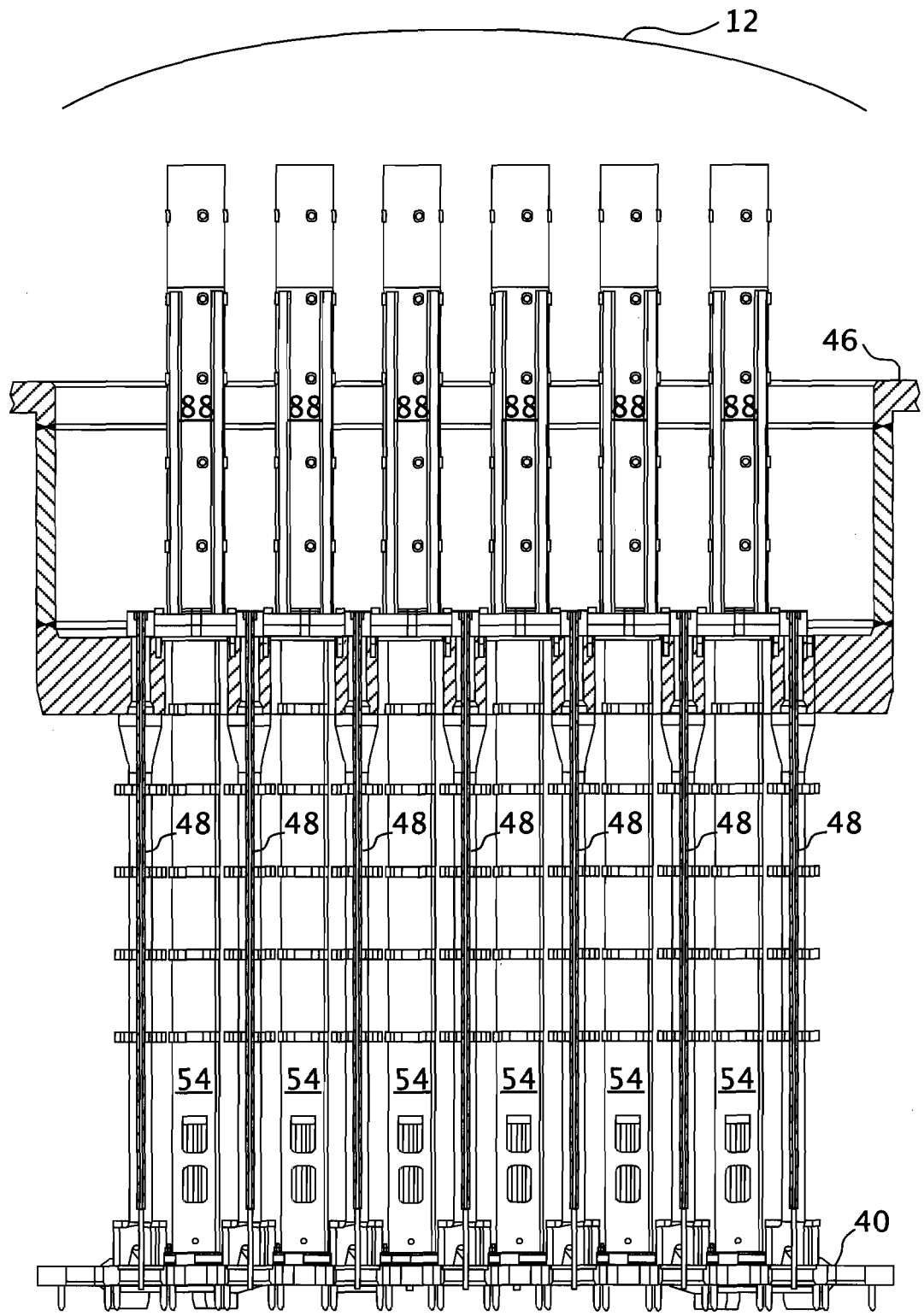
FIG. 3 is an elevational view, partially in section showing more detail of the upper internal structure of FIG. 2.

FIG. 3 provides an enlarged view of the upper internals package from which it can clearly be seen that the control rods, which extend from the head 12 through the upper internals package and into the core below the upper core plate 40, are guided substantially over the entire distance by the control rod guide tubes 54 and the control rod guide tube extensions 88. However, the in-core instrumentation which are guided through the support columns 48 only receive support above the elevation of the reactor core between the upper core plate 40 and the upper support assembly 46. A substantial distance remains between the upper support assembly 46 and the head 12 over which the in-core instrumentation is exposed once it is withdrawn from the core.

In accordance with this invention, some or all of the instrumentation is routed through one or more penetrations 56 in the head 12. This invention provides a structural modification to provide support for the in-core instrument thimble assemblies 52 in their withdrawn position where they extend above the upper support plate 46.

Figure 4:
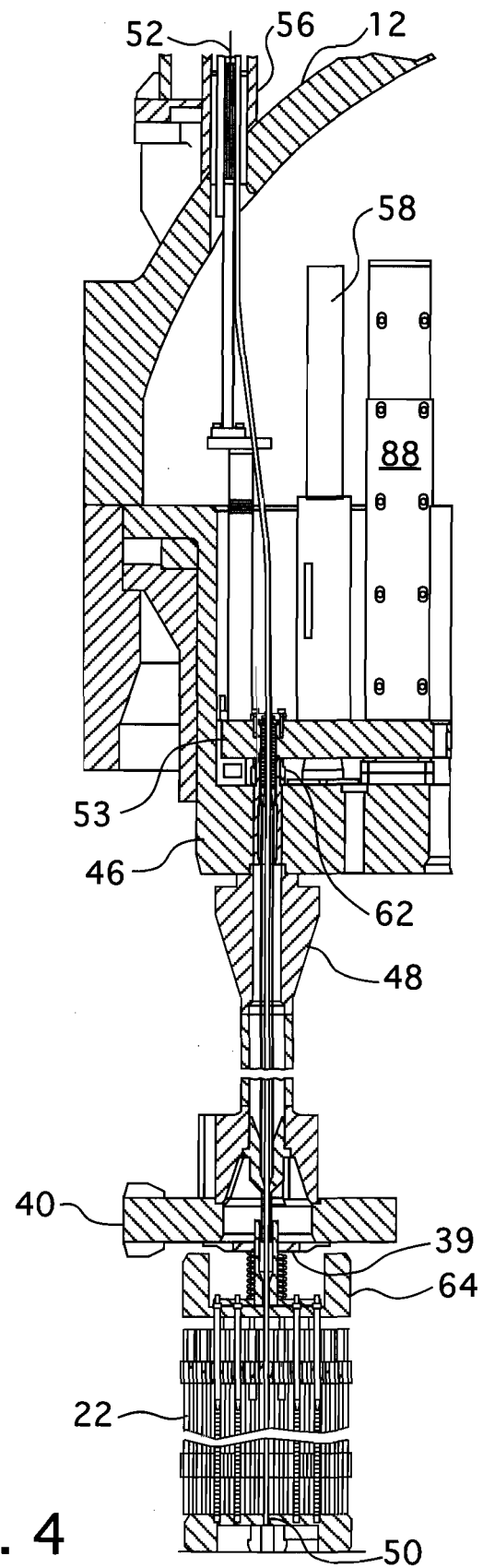
FIG. 4 is an elevational view partially in section of a portion of the interior of the reactor vessel showing the instrumentation guide path from the instrumentation tube within a fuel assembly up to and through the head penetration.
Figure 5:
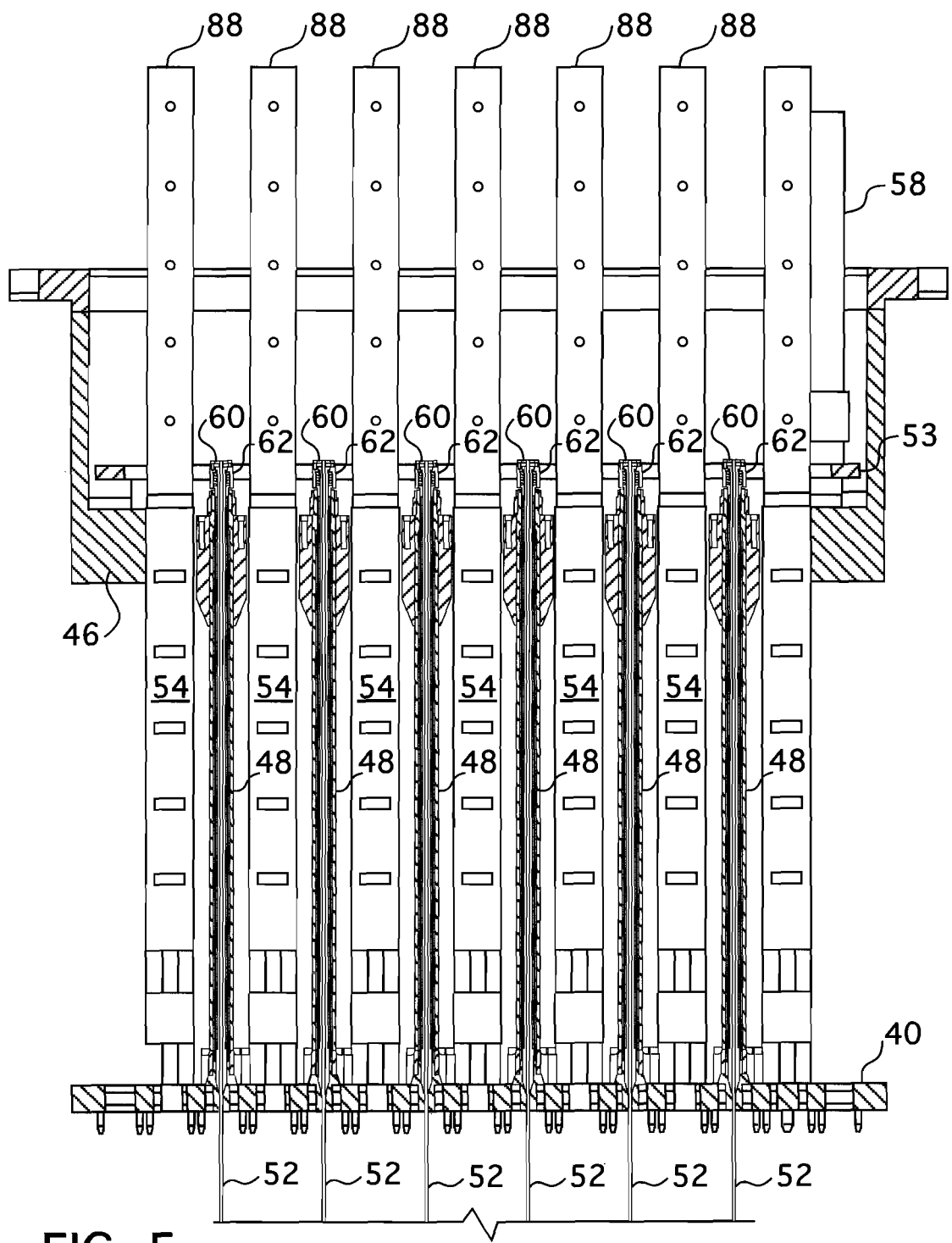
FIG. 5 is an elevational view partially in section of an upper internals package incorporating this invention.
Figure 6:
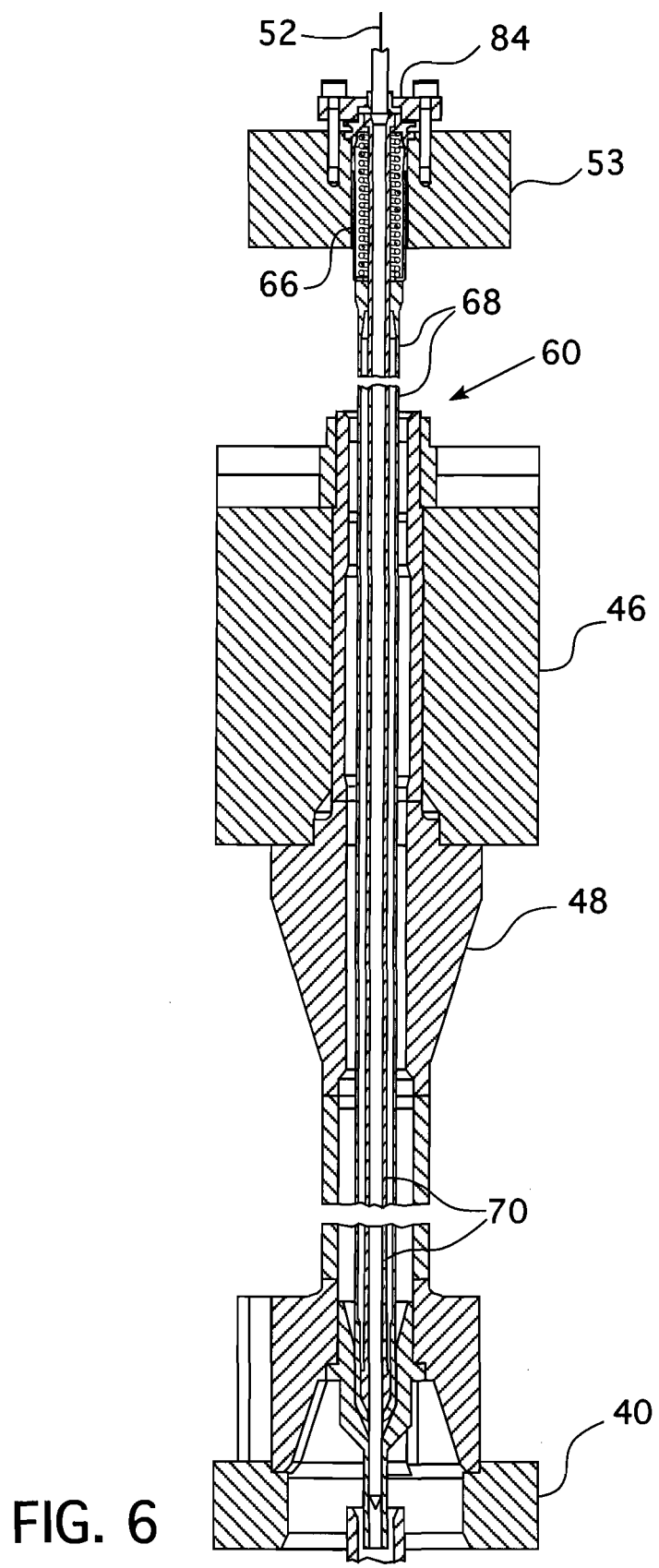
FIG. 6 is an enlarged sectional view of one of the support columns illustrated in FIG. 5 showing the configuration of the slidable sleeve of this invention with the instrumentation grid assembly in its lower most position.
Figure 7:
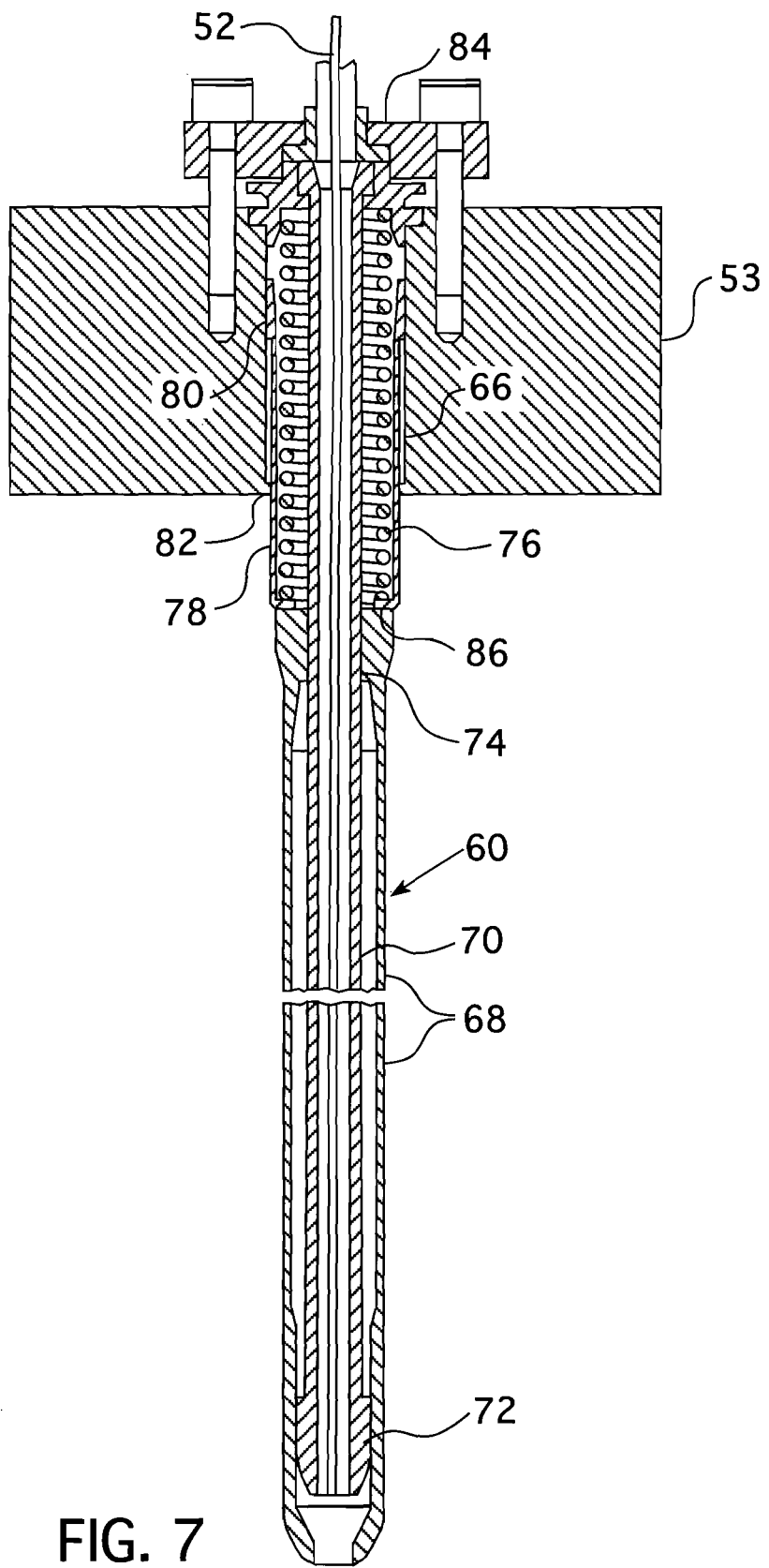
FIG. 7 is a sectional view of the telescoping slidable sleeve of this invention shown in FIGS. 5 and 6 with the instrumentation grid assembly in its lower most position.

FIG. 4 shows the full path of insertion of the in-core instrument thimble assemblies 52. The in-core instrument thimble assemblies 52 are routed through the reactor head penetration 56 and extend through the area above the upper support plate 46 and into an upper opening in the support columns 48. The in-core instrument thimble assemblies 52 then proceed down through the center of the support columns 48, through the upper core plate 40, through the thimble plugging device 39, through the fuel assembly upper nozzle 64 and into the fuel assembly instrumentation tubes 50. As shown in FIGS. 5 and 6, in accordance with this invention, the support columns 48 are provided with a slidable sleeve 60 that is extendable from the upper portion 62 of the support columns 48 into the area above the upper support plate 46 to support the in-core instrument thimble assemblies 52 when they are withdrawn from the fuel assemblies 22 to gain access to the core. In reactors such as the AP1000 supplied by the Westinghouse Electric Company LLC, Pittsburgh, Pa., the length of withdrawal required to raise the in-core instrument thimble assemblies 52 to the mid plane of the upper core plate 40 is typically larger than the height of the support columns 48 which leaves the highly irradiated upper portion of the in-core instrument thimble assemblies 52 exposed above the upper support plate 46, unguided and potentially subject to damage. Typically, in the AP1000 design the in-core instrument thimble assemblies 52 need to be raised approximately 185 inches (470 cm). The slidable sleeves 60 are designed to extend to support the exposed area of the in-core instrument thimble assemblies 52 above the upper support plate 46.

Figure 8:
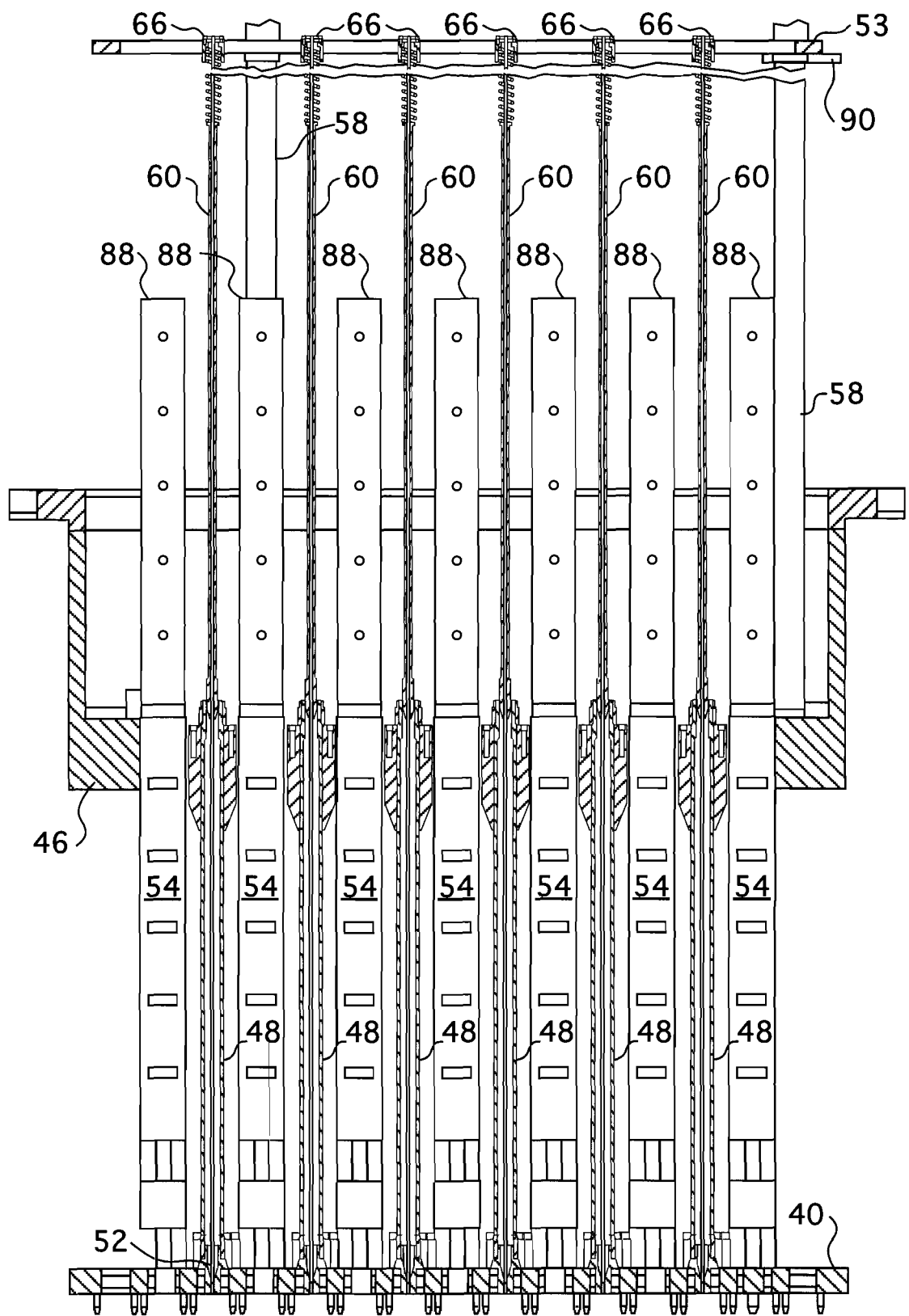
FIG. 8 is an elevational view, partially in section, of the upper internals package shown in FIG. 5 with the instrumentation grid assembly of this invention shown in its upper most position.
Figure 9:
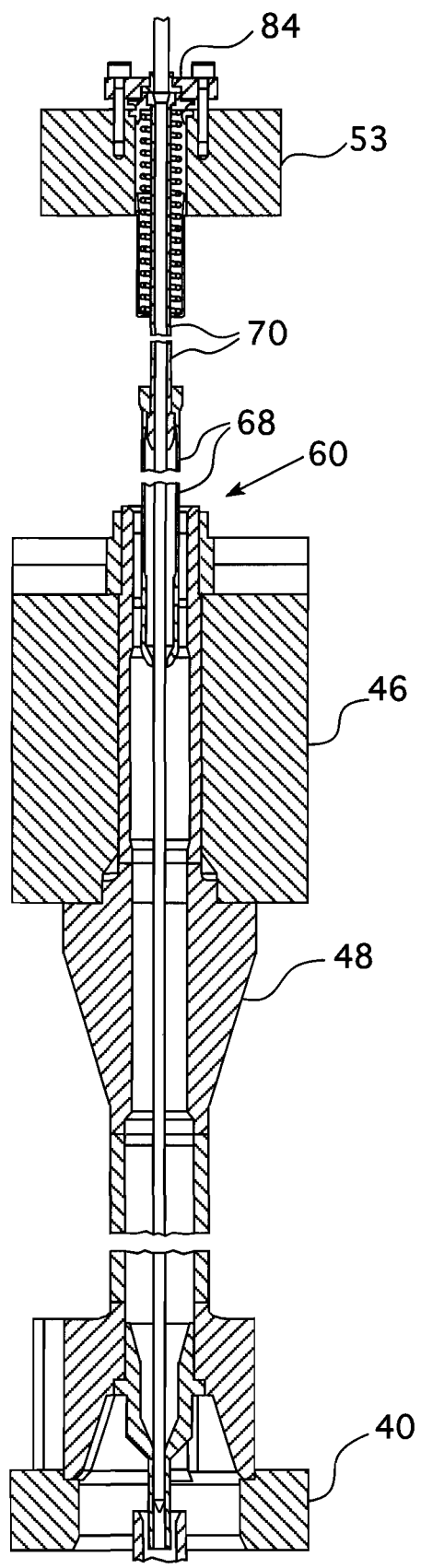
FIG. 9 is an enlarged sectional view of a support column in accordance with this invention in foreshortened form with the telescoping sleeve in its fully extended position.
Figure 10:
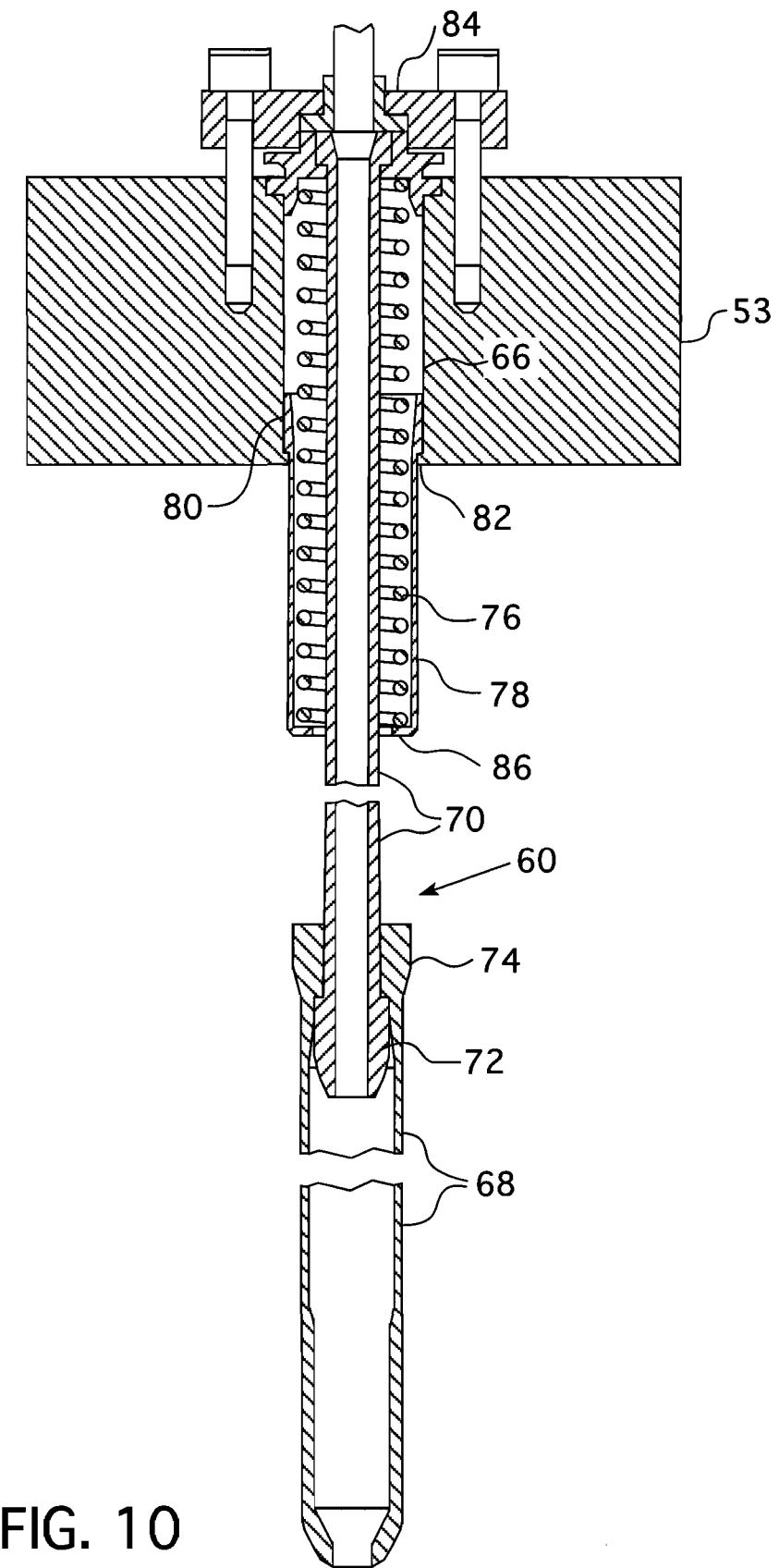
FIG. 10 is an enlarged sectional view of the telescoping slidable sleeve shown in FIG. 9 in its fully extended position.

As shown in FIGS. 6-9, the slidable sleeve 60 extends through an opening 66 in an instrumentation grid assembly 53 that extends horizontally over a substantial width of the upper support assembly 46. The instrumentation grid assembly 53 is supported to move axially on a plurality of guide studs 58 (shown in FIGS. 5 and 8) that are anchored to and extend upwardly from the upper support plate 46. Preferably, four guide studs 58 are equally spaced around the periphery of the instrument grid assembly 53. A cross section of the upper internals showing the instrumentation grid assembly 53 in its lower most position with the slidable sleeves 60 fully retracted within the corresponding support columns 48 is shown in FIG. 5 with more detail of the slidable sleeve shown in FIGS. 6 and 7. The slidable sleeve 60 comprises two tubes; an outer telescoping sleeve 68 and a fixed inner instrument tube 70 in which the in-core instrument thimble assembly 52 passes through. The instrument tube 70 extends slightly above the instrumentation grid assembly 53 and is anchored to the top surface thereof by the holddown plate assembly 84. The lower portion of the instrument tube 70 is telescopically received within an opening in the outer sleeve 68 and has an enlarged lower end 72 that is captured within a narrowed opening 74 within the outer sleeve 68 so that the instrument tube 70 cannot readily separate from the outer sleeve 68. A spiral spring 76 surrounds an upper portion of the instrument tube 70 between the holddown plate assembly 84 and a can housing 78 that surrounds a lower portion of the spring 76. The can housing has an enlarged upper portion 80 that is slidably mounted and axially movable within the instrumentation grid assembly slidable sleeve opening 66. The enlarged upper portion 80 of the can housing 78 is captured within the opening 66 by a lower annular lip 82. The lower portion of the can housing 76 has a lower lip 86 that captures the spring and seats upon the upper portion 74 of the outer sleeve 68 when the instrument grid assembly 53 is in its lower most position. With the instrumentation grid assembly 53 in its lower most position, the spring 76 exerts a force of approximately 50 pounds on the outer sleeve which prevents the sleeve from vibrating. FIG. 8 shows the cross section of the upper internals package previously shown in FIG. 5 with the instrumentation grid assembly 53 in its fully elevated position and the telescoping sliding sleeve 60 fully extended. FIG. 9 provides a more detailed cross sectional view in foreshortened form of the support column 48, sliding telescoping sleeve 60 and instrumentation grid assembly 53 and FIG. 10 shows a more detailed view of the telescoping sleeve 60 in its fully extended position. As can be observed in FIGS. 9 and 10, the inner instrument tube 70 extends until the enlarged end 72 abuts the narrowed opening 74 in the outer sleeve 68. As the inner instrument tube 70 extends the spring 76 decompresses and the spring can housing 78 moves down the opening 66 until the enlarged end 80 is captured by the lower lip 82 on the opening 66. The lower lip 86 on the spring can housing 78 prevents the spring 76 from moving further down the inner instrument tube 70.

In the AP1000 design there are 42 in-core instrument thimble assemblies 52 each with its own telescoping sliding sleeve 60 that shields the highly irradiated portion of the in-core instrument thimble assemblies when they are raised above the fuel assemblies to service the core.

After the head of the reactor has been removed, the polar crane within the containment can be employed to raise the instrumentation grid assembly 53 to its fullest, axially extended position where it can be locked in position on the guide studs 58 employing a locking mechanism such as the swing clamp 90. Raising the instrumentation grid assembly 53 simultaneously raises the in-core instrument thimble assemblies from each of the fuel assembly instrumentation tubes 50 so that the upper internals can then be removed as a package to access the core.

Thus, this invention provides a means to protect and support the highly irradiated portion of the in-core instrument thimble assemblies used in a pressurized water reactor in-core instrumentation system while the instrumentation grid assembly is withdrawn during core servicing operations. This invention thus prevents the highly irradiated portion of the in-core instrument thimble assemblies from buckling in the event one or more of the assemblies meets some minor obstruction while the instrumentation grid assembly is being lowered to reinsert the in-core instrument thimble assemblies back into the fuel assemblies following completion of the servicing activities.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. A pressurized water nuclear reactor comprising:
   a pressure vessel;
   an upper removable head for sealably engaging an upper opening in the pressure vessel;
   a core having an axial dimension supported within the pressure vessel;
   a plurality of nuclear fuel assemblies supported within the core;
   at least some of the fuel assemblies having at least one instrumentation tube extending therethrough;
   an upper core plate extending over the nuclear fuel assemblies;
   an upper support plate attached to either the upper removable head or the pressure vessel and extending across the upper opening in the pressure vessel;
   a plurality of support columns extending at least partially between the upper core plate and the upper support plate, at least some of the support columns having an axially extending opening therethrough with the opening extending a length of the support column and being aligned axially with a corresponding instrumentation tube through an opening in the upper core plate; and
   an axially slidable sleeve through which a measurement device can travel as the measurement device is moved into or out of one of the instrumentation tubes during reactor outages, the sleeve extending at least partially through and into an upper end in at least some of the support columns that are aligned with the corresponding instrumentation tube, the sleeve having at least a portion thereof captured within the axially extending opening in the support column and, during an outage in which the core is to be accessed, substantially the entire sleeve is configured to be axially moveable within the corresponding support column's axially extending opening and extendable from the corresponding support column through an opening in the upper support plate into an area above the upper support plate in a manner that varies an axial length of the sleeve a distance that withdraws the measurement device completely from the instrument tube without the sleeve leaving the upper end of the support column while continuing to shield a portion of the measurement device that was shielded from a reactor coolant during reactor operation, from the coolant above the upper support plate.

2. The pressurized water nuclear reactor of claim 1 wherein a plurality of the support columns have the axially slidable sleeve extending through the upper end of the corresponding support column and the upper end of the support column is attached to and communicates through the upper support plate, including an instrumentation grid assembly positioned within the upper removable head above the upper support plate extending over each of the slidable sleeves and having openings through which the slidable sleeves communicate, an upper portion of the slidable sleeves being attached to the instrumentation grid assembly and the instrumentation grid assembly being movable in an axial direction to slide each of the slidable sleeves within the corresponding support column.

3. The pressurized water nuclear reactor of claim 2 including a plurality of guide studs axially extending from an upper surface of and spaced around the upper support plate and through corresponding openings in the instrumentation grid assembly, for laterally supporting the instrumentation grid assembly as it moves axially.

4. The pressurized water nuclear reactor of claim 3 wherein at least some of the guide studs are spaced around the perimeter of the instrumentation grid assembly.

5. The pressurized water nuclear reactor of claim 4 wherein there are approximately four guide studs substantially equally spaced around the perimeter of the instrumentation grid assembly.

6. The pressurized water nuclear reactor of claim 2 wherein the slidable sleeve comprises a plurality of concentric telescoping tubes that extend between the instrumentation grid assembly and the corresponding support column with an upper tube of the telescoping tubes sliding within a lower tube of the telescoping tubes.

7. The pressurized water nuclear reactor of claim 1 wherein a lower portion of the slidable sleeve is enlarged and restrained below a narrowed opening within an upper portion of the support column so that the slidable sleeve is captured within the opening within the support column.

8. The pressurized water nuclear reactor of claim 1 including an in core instrument thimble assembly that passes through and slides within the slidable sleeve and passes into the instrumentation tube in the fuel assembly when the reactor is operating wherein the slidable sleeve extends axially, without completely leaving the axially extending opening in the support column, to at least a distance above the upper support plate to raise the in-core instrument thimble assembly to at least the mid plane of the upper core plate without the in-core instrument thimble assembly extending above the slidable sleeve when the reactor is shutdown and the core is to be accessed.

9. The pressurized water nuclear reactor of claim 8 wherein the slidable sleeve extends above the upper support plate for at least 15.4 ft. (47 m.).

10. A nuclear electrical power generating facility having a pressurized water reactor nuclear steam supply system comprising:
- a pressure vessel;
- an upper removable head for sealably engaging an upper opening in the pressure vessel;
- a core having an axial dimension supported within the pressure vessel;
- a plurality of nuclear fuel assemblies supported within the core;
- at least some of the fuel assemblies having at least one instrumentation tube extending axially therethrough;
- an upper core plate extending over the nuclear fuel assemblies;
- an upper support plate attached to either the upper removable head or the pressure vessel and extending across the upper opening in the pressure vessel;
- a plurality of support columns extending at least partially between the upper core plate and the upper support plate, at least some of the support columns having an axially extending opening therethrough with the opening extending a length of the support column and being aligned axially with a corresponding instrumentation tube through an opening in the upper core plate; and
- an axially slidable sleeve through which a measurement device can travel as the measurement device is moved into or out of one of the instrumentation tubes during reactor outages, the sleeve extending at least partially through and into an upper end in at least some of the support columns that are aligned with the corresponding instrumentation tube, the sleeve having at least a portion thereof captured within the axially extending opening in the support column and, during an outage in which the core is to be accessed, substantially the entire sleeve being configured to be axially moveable within the corresponding the support column's axially extending opening and extendable from the corresponding support column through an opening in the upper support plate to an area above the upper support plate in a manner that varies an axial length of the sleeve a distance that withdraws the measurement device completely from the instrument tube without the sleeve leaving the upper end of the support column while continuing to shield a portion of the measurement device that was shielded from a reactor coolant during reactor operation, from the coolant above the upper support plate.

11. A pressurized water nuclear reactor comprising:
a pressure vessel;
an upper removable head for sealably engaging an upper opening in the pressure vessel;
a core having an axial dimension supported within the pressure vessel;
a plurality of nuclear fuel assemblies supported within the core;
at least some of the fuel assemblies having at least one instrumentation tube extending axially therethrough;
an upper core plate extending over the nuclear fuel assemblies;
an upper support plate attached to either the upper removable head or the pressure vessel and extending across the upper opening in the pressure vessel;
a plurality of support columns extending at least partially between the upper core plate and the upper support plate, at least some of the support columns having an axially extending opening therethrough with the opening extending a length of the support column and being aligned axially with a corresponding instrumentation tube through an opening in the upper core plate;
an axially slidable sleeve through which a measurement device can travel as the measurement device is moved into or out of one of the instrumentation tubes during reactor outages, the sleeve extending at least partially through and into an upper end in at least some of the support columns that are aligned with the corresponding instrumentation tube, the sleeve having at least a portion thereof captured within the axially extending opening in the support column and, during an outage in which the core is to be accessed, substantially the entire sleeve being configured to be axially moveable within the corresponding support column's axially extending opening and extendable from the corresponding support column through an opening in the upper support plate into an area above the upper support plate in a manner that varies an axial length of the sleeve a distance that withdraws the measurement device completely from the instrument tube without the sleeve leaving the upper end of the support column while continuing to shield a portion of the measurement device that was shielded from a reactor coolant during reactor operation, from the coolant above the upper support plate;
wherein a plurality of the support columns have the axially slidable sleeve extending through the upper end of the corresponding support column and the upper end of the support column is attached to and communicates through the upper support plate, including an instrumentation grid assembly positioned above the upper support plate extending over each of the slidable sleeves and having openings through which the slidable sleeves communicate, an upper portion of the slidable sleeves being attached to the instrumentation grid assembly and the instrumentation grid assembly being movable in an axial direction to slide each of the slidable sleeves within the corresponding support column;
wherein the slidable sleeve comprises a plurality of concentric telescoping tubes that extend between the instrumentation grid assembly and the corresponding support column with an upper tube of the telescoping tubes sliding within a lower tube of the telescoping tubes; and
including a spiral spring extending around at least one of the concentric telescoping tubes below an attachment of the slidable sleeve to the instrumentation grid assembly and between the attachment of the slidable sleeve to the instrumentation grid assembly and another of the telescoping tubes to provide a force on the telescoping tubes in an axial downward direction when the instrumentation grid assembly is in a lower most position, to prevent vibration of the telescoping tubes.

12. The pressurized water nuclear reactor of claim 11 wherein a first end of the spring extends at least partially into the opening in the instrumentation grid assembly through which the slidable sleeve extends and a second end of the spring extends axially below the opening in the instrumentation grid assembly and the second end of the spring is surrounded by and captured within a can housing that is slidably mounted within the opening in the instrumentation grid assembly.

13. The pressurized water nuclear reactor of claim 12 wherein an upper portion of the can housing is captured within the opening in the instrumentation grid assembly.

* * * * *